United States Patent
Carine

(10) Patent No.: US 7,506,926 B2
(45) Date of Patent: Mar. 24, 2009

(54) SAFETY SEAT

(75) Inventor: David Shaun Carine, Hampshire (GB)

(73) Assignee: Britax Excelsior Limited, Hampshire (GB)

( * ) Notice: Subject to any disclaimer, the term of this patent is extended or adjusted under 35 U.S.C. 154(b) by 29 days.

(21) Appl. No.: 10/598,855

(22) PCT Filed: Mar. 11, 2005

(86) PCT No.: PCT/GB2005/000966

§ 371 (c)(1),
(2), (4) Date: May 23, 2007

(87) PCT Pub. No.: WO2005/087537

PCT Pub. Date: Sep. 22, 2005

(65) Prior Publication Data

US 2007/0222262 A1    Sep. 27, 2007

(30) Foreign Application Priority Data

Mar. 13, 2004 (GB) .................................. 0405716.2
Mar. 13, 2004 (GB) .................................. 0405717.0

(51) Int. Cl.
  *B60N 2/42* (2006.01)
(52) U.S. Cl. .................. 297/216.12; 297/391; 297/406; 297/216.11
(58) Field of Classification Search ................ 297/391, 297/406, 216.12, 216.11

See application file for complete search history.

(56) References Cited

U.S. PATENT DOCUMENTS 3,027,193 A * 3/1962 Graham ...................... 297/391
3,730,589 A * 5/1973 Lane ........................... 297/391

(Continued)

FOREIGN PATENT DOCUMENTS

DE          3039934 A1     5/1982

(Continued)

*Primary Examiner*—Laurie K Cranmer
(74) *Attorney, Agent, or Firm*—Adams Intellectual Property Law, P.A.

(57) ABSTRACT

A deformable, polypropylene-moulding lining (11), is provided in a head rest. It has a crosspiece (12), clipped (14) to the head support (5) and right and left deformable wings (15, 16). These are longer than the support wings (5, 6) of the head part (4), extending past distal edges (17) of the support wings. The deformable wings are spaced inwards from the support wings, with voids (18) defined between them. The deformable wings are divided into two in their forwards extent by a living hinge (19) into a front portion (20) and a rear portion (21). The living hinge is positioned just inside the distal edges of the shell wings. The injection moulded lining has its own foam materiel lining (22), the whole being covered with upholstery (23). The result of the arrangement is that if an occupant's head H impacts the lining in side impact of the vehicle equipped with the seat, the relevant lining wing will be pressed against the shell wing. This involves energy absorbing (maximum acceleration limiting) deformation of not only the foam material, but also of the lining wing and to a less extent of the shell wing. With the lining wing deformation (24), the front portion (20) of the lining wing pivots forwards about the shell edge (17), from a position swept back with respect to the shell wing to a position generally in line with the compressed inner portion of the lining.

14 Claims, 3 Drawing Sheets

U.S. PATENT DOCUMENTS

| | | | | |
|---|---|---|---|---|
| 3,922,034 | A | * | 11/1975 | Eggert .................... 297/216.12 |
| 4,178,038 | A | * | 12/1979 | Yada et al. ................... 297/391 |
| 4,205,878 | A | * | 6/1980 | Wooten ....................... 297/391 |
| 4,402,548 | A | * | 9/1983 | Mason ........................ 297/464 |
| 4,838,611 | A | * | 6/1989 | Talaugon .................... 297/391 |
| 4,883,243 | A | * | 11/1989 | Herndon ................. 244/122 R |
| 5,211,696 | A | * | 5/1993 | Lacy ........................... 297/397 |
| 5,934,749 | A | * | 8/1999 | Pond et al. ............. 297/188.04 |
| 6,120,099 | A | * | 9/2000 | Reikerås et al. ............. 297/391 |
| 6,485,101 | B2 | * | 11/2002 | Kassai et al. ............. 297/250.1 |
| 7,080,886 | B2 | * | 7/2006 | Bauer ......................... 297/409 |
| 7,086,695 | B2 | * | 8/2006 | Hosoya ................. 297/256.16 |
| 7,131,698 | B2 | * | 11/2006 | Dowty et al. ............... 297/408 |
| 7,213,884 | B2 | * | 5/2007 | Flory et al. ................. 297/398 |
| 7,264,313 | B2 | * | 9/2007 | Clough ....................... 297/407 |
| 7,364,239 | B2 | * | 4/2008 | Clough ....................... 297/391 |

FOREIGN PATENT DOCUMENTS

| | | |
|---|---|---|
| DE | 9405366 U1 | 6/1994 |
| DE | 9405366 | 7/1994 |
| DE | 19931391 A1 | 1/2000 |
| DE | 19918517 | 5/2000 |
| DE | 19918517 C1 | 5/2000 |
| DE | 10043290 | 4/2002 |
| DE | 10043290 C1 | 4/2002 |
| EP | 1356987 A | 10/2003 |
| EP | 1356987 A1 | 10/2003 |

* cited by examiner

SAFETY SEAT

The present invention relates to a safety seat, particularly though not exclusively a child safety seat for a vehicle.

Safety seats are designed:
to restrain the occupant from being thrown more than a certain distance from the seat in the event of an accident and
to limit the deceleration (both its maximum value and its period above a threshold) experienced by an occupant.

A direction in which less distance is available before impact of an occupant with a vehicle part than some others is sideways towards a window, door or door pillar. To restrain sideways movement of an occupant's head, seats can be provided with a head protecting structure in the form of a vertical extension of a back of the seat, the extension having forwards extending wings for limiting lateral movement of the head. In this specification, this structure is referred to as a "winged headrest". To avoid the wings causing the self-same problem that the seat is intended to avoid, namely injury from impact with a hard surface, the winged headrest is normally provided with a padded lining.

Accidents involving sideways movement result from lateral impact, namely impact in oblique or transverse direction involving the impacted vehicle in substantial lateral acceleration.

The object of the present invention is to provide a safety seat with improved head protection.

According to a first aspect of the invention there is provided a safety seat comprising:
a winged headrest, the head rest having:
a rear head support,
forwards-and-sideways extending support wings, fixed to the rear head support at respective opposite sides thereof and
deformable extensions of the support wings, each extension being hingedly connected to its support wing remote from the rear head support and normally extending obliquely forwards and laterally outwards of its support wing, whereby on lateral impact including impact of the winged headrest with a side part of a vehicle with the extension on the impacted side striking the side part first, the extension hinges inwards.

Such hinging in provides an enhanced area of protection of the head of an occupant of the seat from impact with the vehicle part.

Whilst it can be envisaged that the deformable extensions can be formed integrally with the headrest, as by integral injection moulding and provision of a living hinge, in the preferred embodiment, they are provided as pivotal extensions of a lining within the winged headrest.

In particular, the lining can be:
the lining is secured to the headrest at a root between the rear head support and its support wings,
the lining has lining wings within the support wings,
the lining via its pivotal extensions abuts the distal end of the support wings, with hinged connections between the lining wings and the lining pivotal extensions being within the distal end of the support wings and
the lining defines voids between itself and the support wings, whereby on lateral impact including impact of the head of an occupant of the safety seat with one of the lining wings:
head acceleration energy is absorbed in deformation of the lining wing towards its support wing and
as the lining wing is deformed towards its support wing, the lining extension past the distal end of its support wing pivots about the distal end and the forwards extension is pivotally moved inwards with respect to the lateral extent of the wings.

It should be noted that the safety seat of the invention has been defined in a forwards facing orientation. If the seat is installed to face rearwards, the head support will be in front of the wings, which will be rearwards-and-sideways facing.

Despite careful design of winged headrests and their linings, their effectiveness can be limited by the need to enable the occupant to feel unencumbered, encumbrance tending to cause nausea.

An advantage of this invention is that a safety seat fitted with the forwards extensions provides enhanced protection without the feeling of encumbrance that would result from having them fixed in the position to which they are adapted to pivot.

Whilst it can be envisaged that the deformable lining wings could be individually connected to the rear head support, as by tongues on the lining wings engaging in slots in the rear head support; in the preferred embodiment, the two lining wings are interconnected by a crosspiece abutting the rear head support.

The lining wings can be provided with energy absorbent pads on their sides away from their support wings, i.e. on their inner sides.

Normally the lining wings and their pads where provided, together with their crosspiece where provided, will be covered with upholstery fabric.

According to a second aspect of the invention there is provided a safety seat comprising:
a winged headrest, the head rest having:
a rear head support and
forwards-and-sideways extending support wings, fixed to the rear head support at respective opposite sides thereof
deformable lining wings for the support wings, each lining wing
being secured to the headrest at a root between the rear head support and its support wing and
abutting the distal end of its support wing and
defining a void between itself and its support wing, whereby on lateral impact including impact of the head of an occupant of the safety seat with one of the lining wings, head acceleration energy is absorbed in deformation of the lining wing towards its support wing.

Preferably, the deformable lining wings each have a forwards extension past the distal end of its support wing, whereby on such lateral impact, as the lining wing is deformed towards its support wing, it pivots about the distal end and the forwards extension is pivotally moved inwards with respect to the lateral extent of the wings.

It is envisaged that the lining wings and their forwards extension can be of uniform cross-section. However, in the preferred embodiment, the lining wings and their forwards extension are provided with a hinge line therebetween close to but set in from the respective distal end, whereby they are weakened to enable the hinge lines to abut the support wings on deformation to provide predictable inwards movement of the support wings.

To help understanding of the invention, a specific embodiment thereof will now be described by way of example and with reference to the accompanying drawings, in which.

Figure 1:
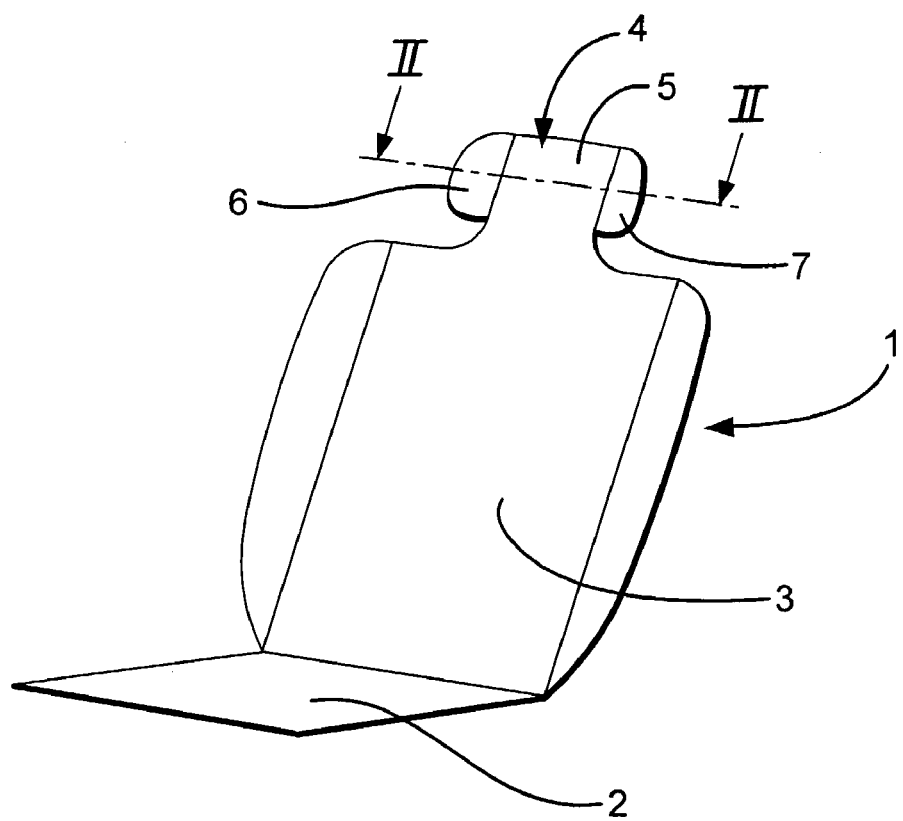
FIG. 1 is a perspective view of a shell of a child safety seat to be equipped with a first embodiment of a head rest in accordance with the invention.

Referring first to FIG. 1 of the drawings, a child safety seat has a chassis or shell 1 comprising a squab 2 and a back 3. The shell can be a unitary moulding or a two part moulding of the squab and the back. Above the back, the shell has a head part 4 having a rear head support 5 and a pair of right and left forwards-and-sideways extending support wings 6,7. The shell is a polypropylene moulding with the head rest being moulded integrally with the rest of the moulding.

Figure 2:
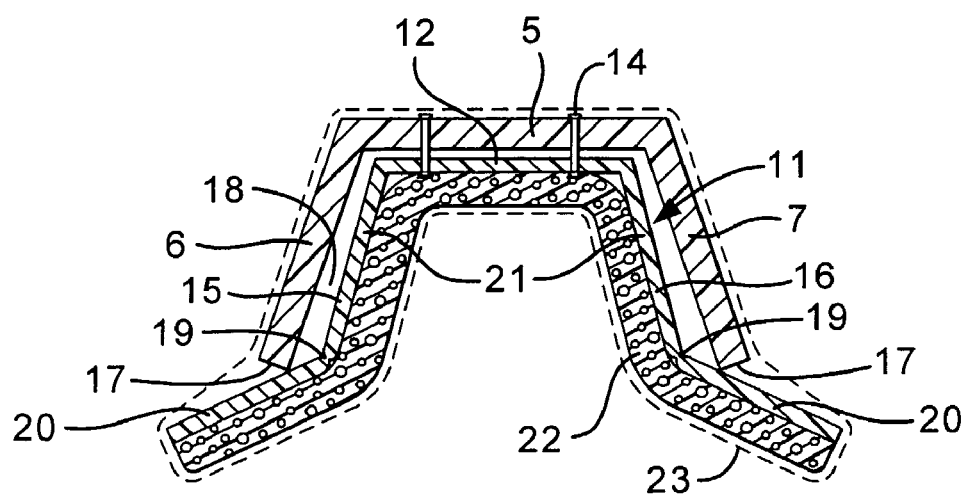
FIG. 2 is a cross-sectional view on the line II-II in FIG. 1 including the lining and upholstery of the head rest of FIG. 1.

In accordance with the invention and as shown in FIG. 2, a deformable lining 11, also a polypropylene moulding, is provided in the head rest. It has a crosspiece 12, clipped 14 to the head support 5 and right and left deformable wings 15,16. These are longer than the support wings 5,6 of the head part 4, extending past distal edges 17 of the support wings. It should be noted also that the deformable wings are spaced inwards from the support wings, with voids 18 defined between them. The deformable wings are divided into two in their forwards extent by a living hinge 19 into a front portion 20 and a rear portion 21. The living hinge is positioned just inside the distal edges of the shell wings.

The injection moulded lining has its own foam material lining 22, the whole being covered with upholstery 23.

Figure 3:
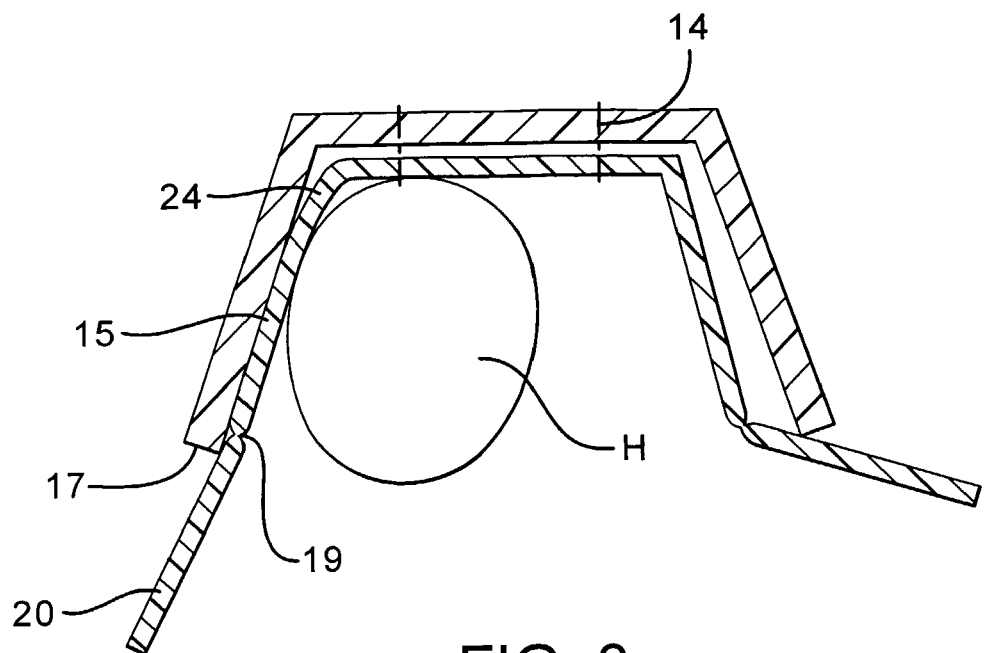
FIG. 3 is a simplified view similar to FIG. 2 of an occupant's head impacting the left-hand wing of the seat of FIG. 1.

The result of the arrangement is that if, as shown in FIG. 3, an occupant's head H impacts the lining in side impact of the vehicle equipped with the seat, the relevant lining wing will be pressed against the shell wing. This involves energy absorbing (maximum acceleration limiting) deformation of not only the foam material, but also of the lining wing and to a less extent of the shell wing. These deformations lead to the result that the acceleration of the head is limited from what it would have been in the absence of the lining wings. The lining wing deformation 24 is shown in FIG. 3 and with it compressing against the shell wing, the front portion 20 of the lining wing pivots forwards about the shell edge 17, from a position swept back with respect to the shell wing to a position generally in line with the compressed inner portion of the lining. This provides for protection of the head in impact with a side window for instance even outside the distal edges, by approximately the length of the front portion beyond the living hinge. Whilst such impact may be thought unlikely if the head has impacted inside the head rest, we are aware from tests that there is a high likelihood of the head moving out of the head rest during a side impact.

Typically, the lining moulding will be 3 mm thick and the foam material 12 mm thick, with a 28 gm/ltr density in EPS. Both lining will be reduced to half its thickness at the hinge. The foam also can be reduced in thickness at the hinge, to facilitate the pivoting.

Figure 4:
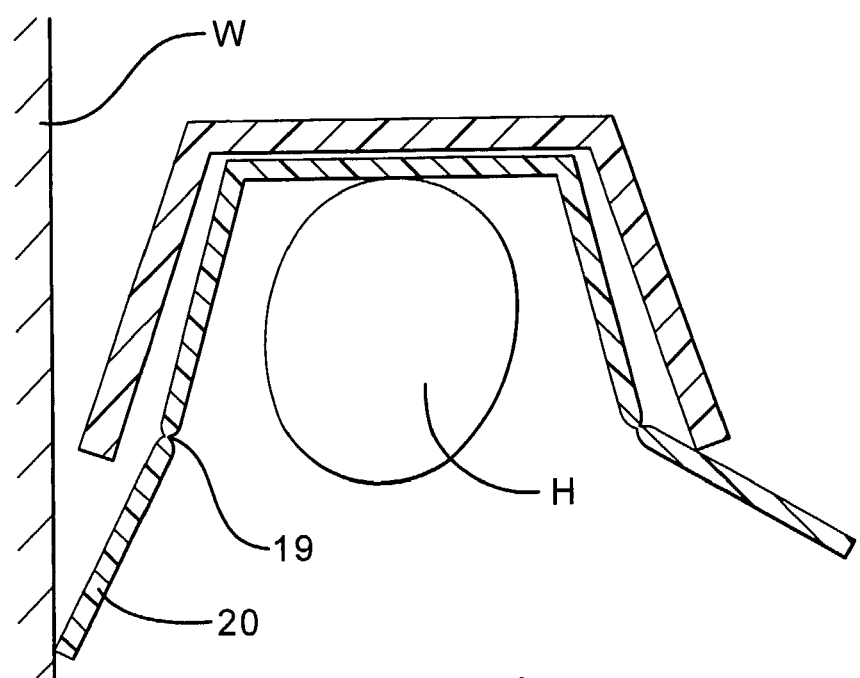
FIG. 4 is a similar view of another impact mode.

Turning now to FIG. 4, it shows an impact mode, wherein the squab of the seat moves less than the top of the seat, as would be the case where the squab impact a wheel arch and causes the top of the seat to pivot against the side window a car. In such impact, and under inertia of the occupant reacting against shoulder wings of the seat shell, the remote end of the front portion 20 can strike the window W before the head strikes the lining. This action causes the front portion to pivot about its living hinge 19.

Figure 5:
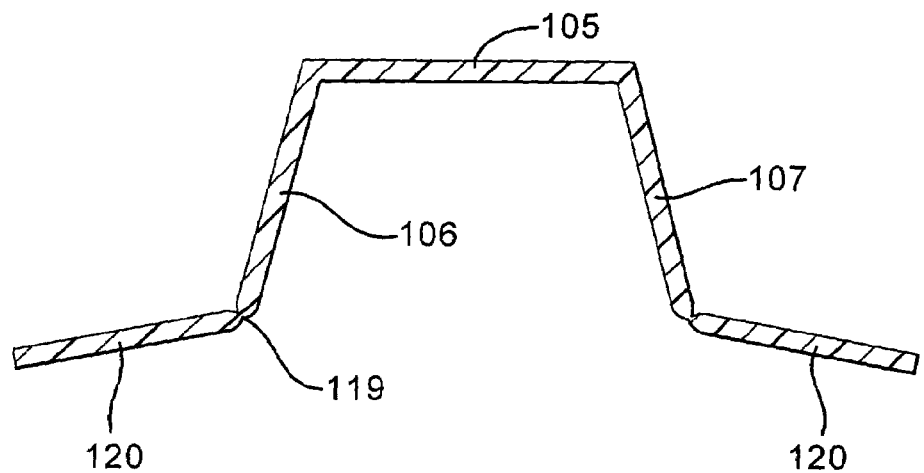
FIG. 5 is a simplified view similar to FIG. 3 of a second embodiment of a head rest in accordance with the invention.
Figure 6:
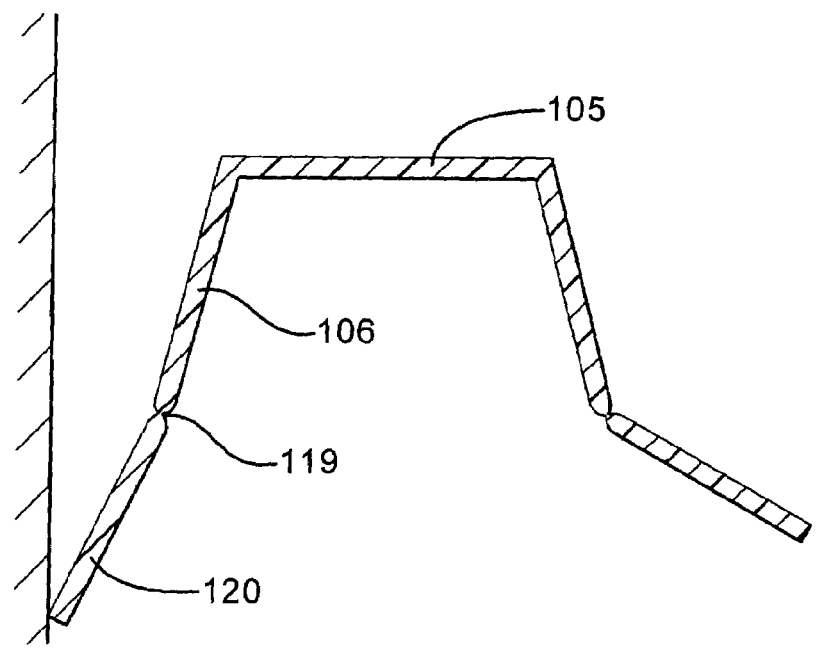
FIG. 6 is a similar view of the second head rest on impact.

Turning on to FIGS. 5 & 6, the head rest thereshown can have an EPS and upholstery lining, neither of which are shown. The headrest as such has a rear head support 105 and a pair of right and left forwards-and-sideways extending support wings 106,107. Integrally moulded with the wings are extensions 120, connected to thereto at living hinges 119. The extensions extend forwards and laterally outwards.

On impact as in FIG. 4, the extensions pivot in to provide an enhanced region of protection from impact of the head with the vehicle side.

The invention claimed is:

1. A safety seat comprising:
    (a) a winged head rest, the head rest having:
        (i) a rear head support,
        (ii) forwards-and-sideways extending support wings, fixed to the rear head support at respective opposite sides thereof and
        (iii) deformable extensions of the support wings, each extension being hingedly connected to its support wing remote from the rear head support and normally extending obliquely forwards and laterally outwards of its support wing,
    (b) whereby on lateral impact including impact of the winged headrest with a side part of a vehicle with the extension on the impacted side striking the side part first, the extension hinges inwards.

2. A safety seat as claimed in claim 1, wherein the deformable extensions are formed integrally with support wings.

3. A safety seat as claimed in claim 1, wherein the rear head support, the support wings and the deformable extensions are an integral injection moulding with living hinges being provided between the support wings and the extensions.

4. A safety seat comprising a wingedged head rest, the head rest having:
    (a) a rear head support and
    (b) forwards-and-sideways extending support wings, fixed to the rear head support at respective opposite sides thereof
    (c) deformable lining wings for the support wings, each lining wing
        (i) being secured to the headrest at a root between the rear head support and its support wing and
        (ii) abutting the distal end of its support wing and
        (iii) defining a void between itself and its support wing,
    whereby on lateral impact including impact of the head of an occupant of the safety seat with one of the lining wings, head acceleration energy is absorbed in deformation of the lining wing towards its support wing.

5. A safety seat as claimed in claim 4, wherein the deformable lining wings each have a forwards extension past the distal end of its support wing, whereby on such lateral impact, as the lining wing is deformed towards its support wing, it pivots about the distal end and the forwards extension is pivotally moved inwards with respect to the lateral extent of the wings.

6. A safety seat as claimed in claim 5, wherein the lining wings and their forwards extension are of uniform cross-section.

7. A safety seat as claimed in claim 5, wherein the lining wings and their forwards extension are provided with a hinge line therebetween close to but set in from the respective distal end, whereby they are weakened to enable the hinge lines to abut the support wings on deformation to provide predictable inwards movement of the support wings.

8. A safety seat as claimed in claim 7, wherein the weakening is a living hinge.

9. A safety seat as claimed in claim 4, further comprising an energy absorbent pad positioned on a side of the deformable lining about a seat occupant's head.

10. A safety seat as claimed in claim 4, wherein the lining wings and their pads where provided, together with their crosspiece where provided, are covered with upholstery fabric.

11. A safety seat comprising:
- (a) a winged head rest, the head rest comprising:
  - (i) a rear head support, and
  - (ii) forwards-and-sideways extending support wings fixed to the rear head support at respective opposite sides thereof and defining distal edges; and
- (b) a deformable lining secured to the winged head rest, the deformable lining comprising:
  - (i) a head support crosspiece, and
  - (ii) deformable wings fixed to the crosspiece, the deformable wings extending beyond the support wings and divided into front and rear portions by a hinge positioned within the distal edges of the support wings;
- (c) whereby on lateral impact of the winged headrest with a side part of a vehicle the front portions of the deformable wings hinge inwards.

12. A safety seat as claimed in claim 11, wherein the lining abuts the distal ends of the support wings and defines voids between itself and the support wings, whereby on lateral impact including impact of the head of an occupant of the safety seat with one of the deformable wings:
- (i) head acceleration energy is absorbed in deformation of the deformable wing towards its support wing and
- (ii) as the deformable wing is deformed towards its support wing, the front portion extending past the distal edge of its support wing pivots about the distal edge and moves inwards with respect to the support wing.

13. A safety seat as claimed in claim 11, further comprising an energy absorbent pad positioned on a side of the deformable lining about a seat occupant's head.

14. A safety seat as claimed in claim 13, wherein the energy absorbent pad is covered with an upholstery fabric.

\* \* \* \* \*